US012621072B2

(12) United States Patent
Nelson et al.

(10) Patent No.: US 12,621,072 B2
(45) Date of Patent: May 5, 2026

(54) MEDIA IDENTIFICATION USING WATERMARKS AND SIGNATURES

(71) Applicant: The Nielsen Company (US), LLC, New York, NY (US)

(72) Inventors: Daniel Nelson, Tampa, FL (US); Alexander Topchy, New Port Richey, FL (US); Jeremey M. Davis, New Port Richey, FL (US)

(73) Assignee: The Nielsen Company (US), LLC, New York, NY (US)

( * ) Notice: Subject to any disclaimer, the term of this patent is extended or adjusted under 35 U.S.C. 154(b) by 90 days.

(21) Appl. No.: 18/883,911

(22) Filed: Sep. 12, 2024

(65) Prior Publication Data

US 2025/0007634 A1 Jan. 2, 2025

Related U.S. Application Data

(63) Continuation of application No. 17/688,569, filed on Mar. 7, 2022, now Pat. No. 12,126,431, which is a continuation of application No. 16/744,648, filed on Jan. 16, 2020, now Pat. No. 11,271,665, which is a continuation of application No. 16/117,900, filed on Aug. 30, 2018, now Pat. No. 10,581,541.

(51) Int. Cl.
*H04H 60/64* (2008.01)
*H04H 60/37* (2008.01)
*H04H 60/48* (2008.01)

(52) U.S. Cl.
CPC ............ *H04H 60/64* (2013.01); *H04H 60/37* (2013.01); *H04H 60/48* (2013.01)

(58) Field of Classification Search
CPC ......... H04H 60/64; H04H 60/37; H04H 60/48
See application file for complete search history.

(56) References Cited

U.S. PATENT DOCUMENTS

| | | | | |
|---|---|---|---|---|
| 9,106,953 | B2 * | 8/2015 | McMillan | H04N 21/8358 |
| 9,900,636 | B2 * | 2/2018 | Srinivasan | H04N 21/8547 |
| 2003/0021441 | A1 * | 1/2003 | Levy | G10L 19/018 382/100 |
| 2007/0250716 | A1 * | 10/2007 | Brunk | G10L 25/48 713/176 |
| 2010/0058065 | A1 * | 3/2010 | Celik | G10L 19/018 713/176 |
| 2014/0075469 | A1 * | 3/2014 | Zhao | H04N 21/23892 725/32 |

* cited by examiner

*Primary Examiner* — Sumaiya A Chowdhury

(57) ABSTRACT

Apparatus, systems, articles of manufacture, and methods to identify media using watermarks and signatures are disclosed. An example apparatus includes at least one memory, instructions, and processor circuitry to execute the instructions to: determine a first time and a category indicated by a watermark detected in the media, determine a search window based on the first time indicated by the watermark, the search window to at least one of (i) extend a first duration of time before the first time indicated by the watermark or (ii) extend a second duration of time after the first time indicated by the watermark, and compare (i) a query signature associated with a second time within the search window with (ii) a subset of reference signatures associated with the category to identify the media, the query signature generated from the media, the subset of reference signatures generated from reference media associated with the category.

20 Claims, 5 Drawing Sheets

MEDIA IDENTIFICATION USING WATERMARKS AND SIGNATURES

CROSS-REFERENCE TO RELATED APPLICATIONS

This application arises from a continuation of U.S. patent application Ser. No. 17/688,569, titled "MEDIA IDENTIFICATION USING WATERMARKS AND SIGNATURES," filed Mar. 7, 2022, which is a continuation of U.S. patent application Ser. No. 16/744,648, titled "MEDIA IDENTIFICATION USING WATERMARKS AND SIGNATURES," filed Jan. 16, 2020, which is a continuation of U.S. patent application Ser. No. 16/117,900, titled "MEDIA IDENTIFICATION USING WATERMARKS AND SIGNATURES," filed Aug. 30, 2018. U.S. patent application Ser. No. 17/688,569, U.S. patent application Ser. No. 16/744,648 and U.S. patent application Ser. No. 16/177,900 are hereby incorporated by reference in their respective entireties. Priority to U.S. patent application Ser. No. 17/688,569, U.S. patent application Ser. No. 16/744,648 and U.S. patent application Ser. No. 16/117,900 is claimed.

FIELD OF THE DISCLOSURE

This disclosure relates generally to media monitoring, and, more particularly, to media identification using watermarks and signatures.

BACKGROUND

Media, such as a television broadcast, may be encoded with watermarks that, when detected, are decoded to identify the media that was presented.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
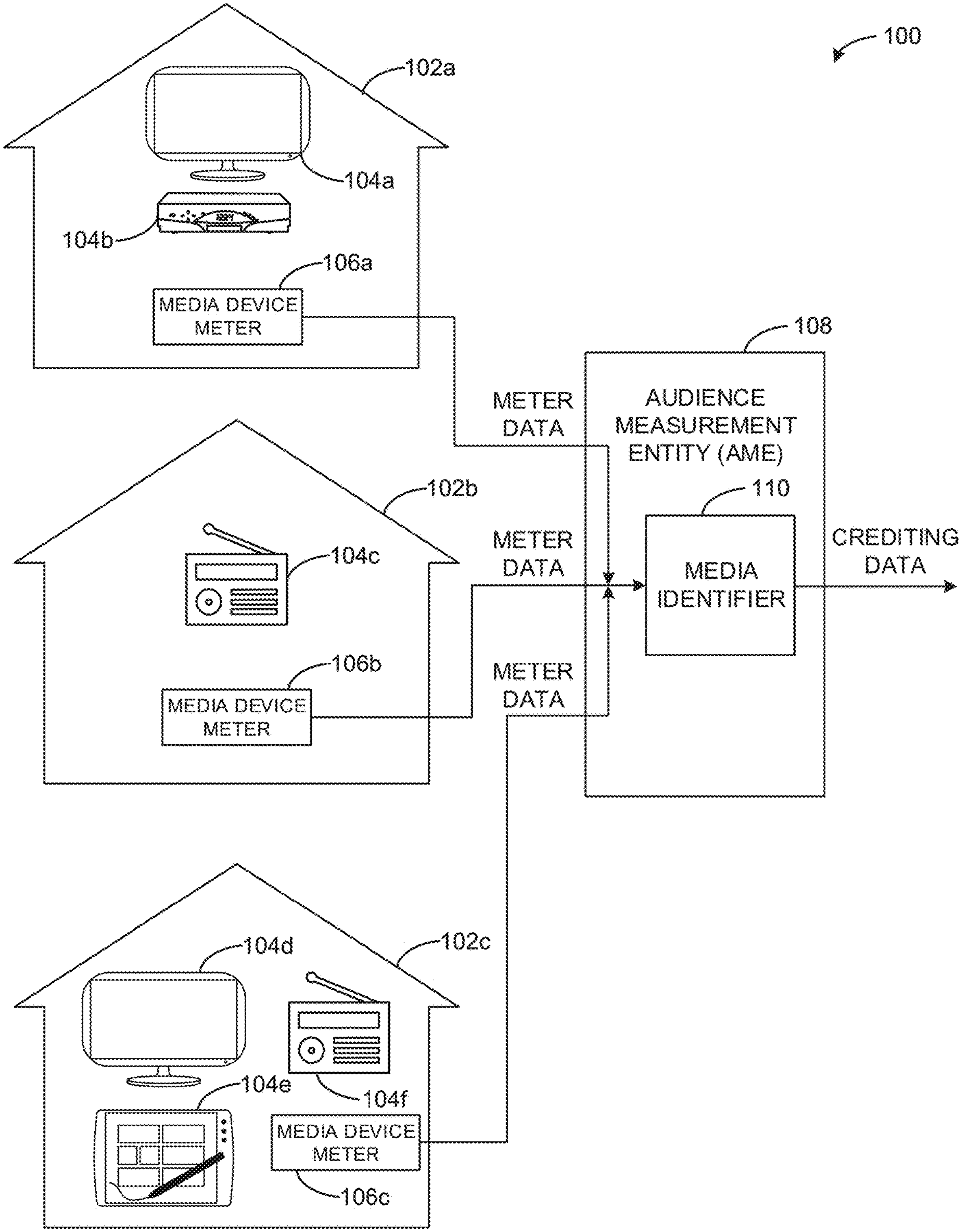
FIG. 1 is an example environment and system for media identification using watermarks and signatures that includes an example media identifier in accordance with the teachings of this disclosure.

Audience measurement entities (AMEs) desire knowledge on how users interact with media devices such as, for example, smartphones, tablets, laptops, televisions, smart televisions, radios, digital video recorders, digital media players, etc. In particular, AMEs want to monitor media presentations made at the media devices to, among other things, determine ownership and/or usage statistics of media devices, relative rankings of usage and/or ownership of media devices, types of uses of media devices (e.g., whether a device is used for browsing the Internet, streaming media from the Internet, etc.), other types of media device information, and/or other monitoring information including, for example, advertisements exposure, advertisement effectiveness, user behavior, purchasing behavior associated with various demographics, etc.

As used herein, the term "media" includes any type of programming, content, and/or advertisements or commercials delivered via any type of distribution medium. Thus, media includes television programming or advertisements, radio programming or advertisements, movies, web sites, streaming media, etc. In examples disclosed herein, monitoring information includes, but is not limited to, media identifying information (e.g., media-identifying metadata, codes, signatures, watermarks, and/or other information that may be used to identify presented media), application usage information (e.g., an identifier of an application, a time and/or duration of use of the application, a rating of the application, etc.), and/or user-identifying information (e.g., demographic information, a user identifier, a panelist identifier, a username, etc.).

Watermarks that are encoded with media and signatures extracted or derived from media may be used to identify the media. Watermarking is a technique used to identify media such as television broadcasts, radio broadcasts, advertisements (television and/or radio), downloaded media, streaming media, prepackaged media, etc. Some watermarking techniques identify media by embedding one or more codes (e.g., one or more watermarks), such as media identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). To identify watermarked media, the watermark(s) are extracted and used to access a table of reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a time interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature.

Monitoring advertisements in broadcast media using watermarks can be difficult because the repetition rate and/or detection rate of the watermarks being detected for a given advertisement, especially short duration advertisements, may be insufficient for the AME to obtain the watermark. Thus, some advertisements may be broadcast and undetected such as, for example, when an entire advertisement is presented between detected watermarks. In addition, monitoring of advertisement using signatures can be time consuming and/or require substantial computer resources to compare the monitored signatures against an AME's complete library of signatures.

The examples disclosed herein use a hybrid of watermark detection and signature generation to identify media. Usually several advertisements are broadcast together. The examples disclosed herein take advantage of this practice by using a detected watermark for a monitored media as an anchor point to select signatures representative of the monitored media in a window before and after the anchor point for comparison with the reference library. In addition, the examples disclosed herein also use the contents of the detected watermark to focus the signature comparison to only a subset of the reference library of signatures. In some examples, the subset of reference signatures includes signatures related to the type of media identified by the watermark or otherwise sharing a characteristic or categorization with the media identified by the watermark.

Thus, the examples disclosed herein use detected watermarks as an indicator of what signatures should be compared to provide an authoritative answer for media identification. These examples optimize media identification by enabling the identification of media, including media of very short duration, using few watermarks including watermarks for other media. These examples further reduce processing resources needed to identify media because only signatures in a subset of signatures are compared to identify the media in question rather than a comparison of signatures against an entire library of signatures kept by or accessible to the AME.

FIG. 1 is an example environment 100 for media monitoring in accordance with the teachings of this disclosure. The example environment 100 represents portions of an example media monitoring system. The example environment 100 includes an example first household 102*a*, an example second household 102*b*, an example third household 102*c*. In some examples, the example households may be example rooms or areas of one household. In other examples, the example households may be a place of business, a school, an outdoor area, and/or other venue or environment. The example first, second, and third households 102*a*, 102*b*, 102*c* of the illustrated example of FIG. 1 are locations where media monitoring is performed. For example, the first, second, and third households 102*a*, 102*b*, 102*c* can be panelist households.

The example environment 100 also includes a plurality of example media presentation devices distributed throughout the environment 100 including, for example, an example first television 104*a*, an example digital video recorder 104*b*, an example first radio 104*c*, an example second television 104*d*, an example tablet 104*e*, and an example second radio 104*f*. Any number or types of media devices or combination of devices may be included in the environment 100.

The example environment also includes an example first media device meter 106*a*, an example second media device meter 106*b*, and an example third media device meter 106*c*. The example media device meters 106*a*, 106*b*, 106*c* monitor media presentation on one or more of the media presentation devices 104*a*, 104*b*, 104*c*, 104*d*, 104*e*, 104*f*. The example first, second, and third media device meters 106*a*, 106*b*, 106*c* of the illustrated example of FIG. 1 collect data pertaining to media consumption in the respective first, second, and third households 102*a*, 102*b*, 102*c*. In some examples, the first, second, and third media device meters 106*a*, 106*b*, 106*c* include microphones, direct connections (e.g., data connections) to the respective media presentation devices 104*a*, 104*b*, 104*c*, 104*d*, 104*e*, 104*f*, wireless connections to the respective media presentation devices 104*a*, 104*b*, 104*c*, 104*d*, 104*e*, 104*f* cameras, and/or any other components to enable media monitoring. In some examples, the first, second, and third media device meters 106*a*, 106*b*, 106*c* are directly wired or otherwise directly communicatively coupled connected to the media presentation devices 104*a*, 104*b*, 104*c*, 104*d*, 104*e*, 104*f*. In other examples, the media device meters 106*a*, 106*b*, 106*c* are coupled to the media presentation devices 104*a*, 104*b*, 104*c*, 104*d*, 104*e*, 104*f* via intermediary devices such as, for example, a set top box or an over-the-top device. The example first, second, and third media device meters 106*a*, 106*b*, 106*c* transmit meter data to an example AME 108, where the meter data can be processed by an example media identifier 110.

The example AME 108 of the illustrated example of FIG. 1 is an entity responsible for collecting media monitoring information. The example AME 108 collects meter data from the first, second, and third households 102*a*, 102*b*, 102*c*. In some examples, the AME 108 is associated with one or more locations (e.g., a central facility) where data is aggregated and/or analyzed. The example AME 108 includes the media identifier 110 to assess the meter data and identify media presented on the media presentation devices 104*a*, 104*b*, 104*c*, 104*d*, 104*e*, 104*f*. In response to identifying the media (e.g. media presented on the media presentation devices 104*a*, 104*b*, 104*c*, 104*d*, 104*e*, 104*f*.), the media identifier 110 and/or the AME 108 can generate crediting data to credit presentation of the identified media such as, for example, to include the presentation of the identified media in a ratings determination.

Figure 2:
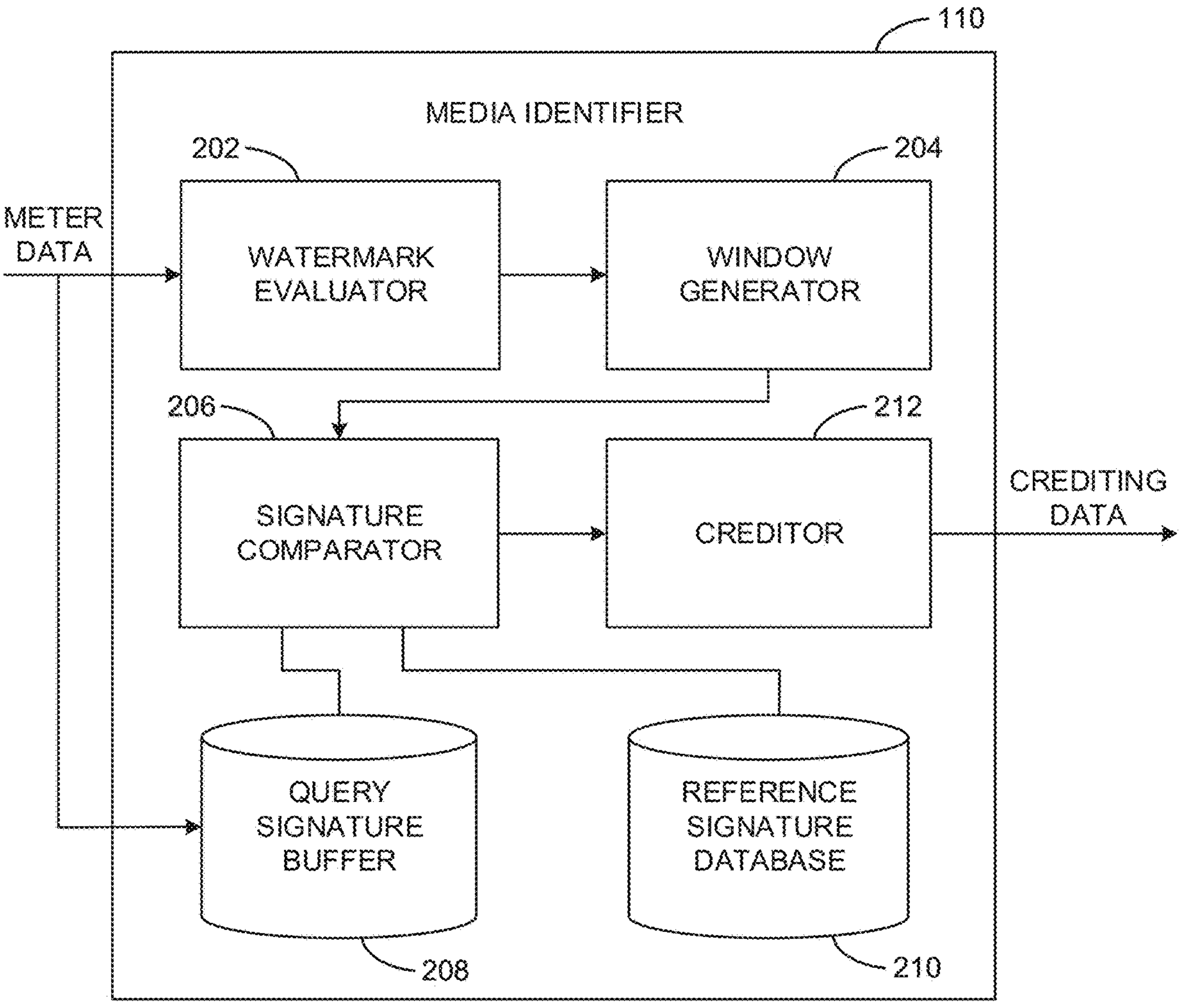
FIG. 2 is a block diagram of the example media identifier of FIG. 1 constructed in accordance with the teachings of this disclosure.

FIG. 2 is a block diagram of the example media identifier 110 of FIG. 1 constructed in accordance with the teachings of this disclosure. The example media identifier 110 includes an example watermark evaluator 202, an example window generator 204, an example signature comparator 206, an example query signature buffer 208, an example reference signature database 210, and an example creditor 212.

Figure 3:
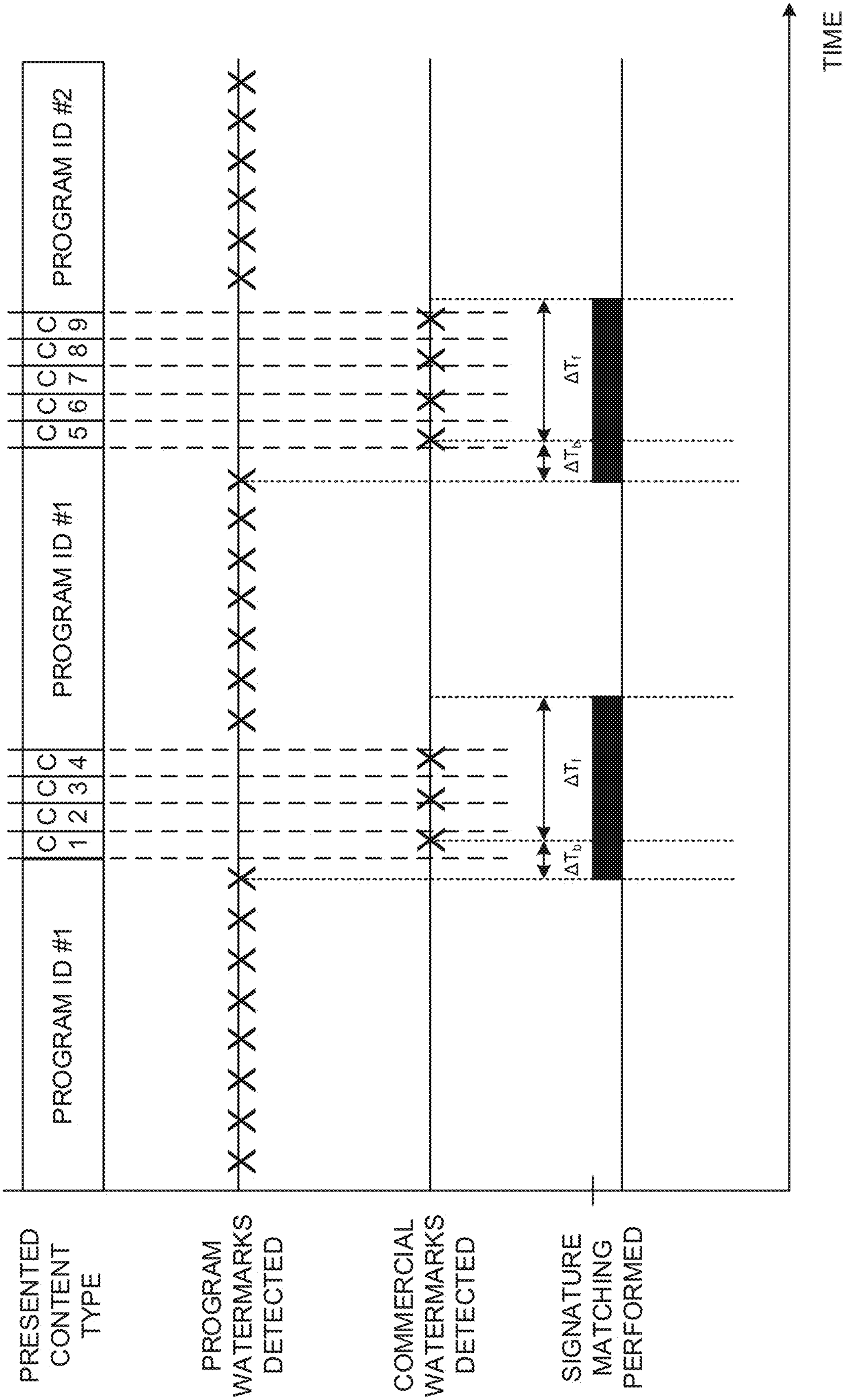
FIG. 3 is a schematic map of watermarks and signatures over time that can be analyzed by the media identifier of FIGS. 1 and 2.

The media identifier 110 accesses or receives meter data via, for example, the watermark evaluator 202 and query signature buffer 208. In some examples, the meter data is sent from the media device meters 106*a*, 106*b*, 106*c* to the media identifier 110 via any suitable communication means. In other examples, the meter data is pulled by or requested by the media identifier 110 from the media device meters 106*a*, 106*b*, 106*c* via any suitable communication means. Example meter data is included in the mapping of watermarks and signatures over time shown in FIG. 3. In FIG. 3, the presented content type includes a plurality of types or instances of media including, for example, a program (PROGRAM ID #1) that is separate by two commercial or advertising breaks in which a plurality of commercials or advertisements are presented. For example, four commercials are presented in the first commercial break (C1, C2, C3, C4). Five commercials are presented in the second commercial break (C5, C6, C7, C8, C9). The program and the commercials (collectively media) include watermarks encoded therein. The watermarks are presented with the media, and the watermarks that are detected are shown with by an X in FIG. 3. In some examples, there may be a presentation of media but the media device meters 106*a*, 106*b*, 106*c* did not detect a corresponding watermark. For example, as shown in the example of FIG. 3, the second commercial (C2) and the seventh commercial (C7) are presented but do have a corresponding detected watermark.

The watermark evaluator 202 evaluates the detected watermarks and identifies times indicated by respective watermarks and characteristics and/or categories indicated by the watermarks. In some examples, the characteristics may include an identifier such as, for example, a unique identifier that may, in some examples, be arbitrary. The identifier is used to connect to a record in an external database, table, etc. that reveals communicated information. In some examples, the identifier is a time or timestamp and/or a category of media as disclosed above. The media identifier 110 has the ability, based on this received knowledge from the watermark evaluated by the watermark evaluator 202, to narrow down the scope of subsequent signature search/match in the reference database, make this search more accurate, and find more correct matches for more of query signatures, as disclosed herein.

The watermark evaluator 202 may also use the watermarks to identify the media directly. The media identifier 110 also ensures that all media is detected. For example, the watermark evaluator 202 can evaluate the watermark gathered during the presentation of the first commercial (C1) and determine the timing of the presentation of the first commercial (C1) and the identification of the first commercial (C1) from the watermark. In addition, the watermark evaluator 202 can evaluate the watermark gathered during the presentation of the third commercial (C3) and determine the timing of the presentation of the third commercial (C3) and the identification of the third commercial (C3) from the watermark. With knowledge of the watermarks detected with the first commercial (C1) and the third commercial (C3), it may not be clear that there was no intervening media. That is, the third commercial (C3) may have been presented immediately following the first commercial (C1), or there may have been additional media such as, for example, the second commercial (C2) that was presented after the first commercial (C1) but before the third commercial (C3) for which no related watermark was detected. Intervening media may be missed, for example, when the intervening media is of a short duration such as, for example, six seconds or less.

The example media identifier 110 is structured to and/or programmed to identify presented media including media for which no watermark was detected. The media identifier 110 includes the window generator 204, which uses the timing of a watermark identified by the watermark evaluator 202 to establish a search window. Thus, the window generator 204 uses the detected watermark as an anchor point around which a search window is created.

In the example of FIG. 3, the window generator 204 uses the watermark detected during the first commercial (C1) as an anchor point. The window generator 204 establishes a window about the anchor point that includes a duration back in time preceding the anchor ($\Delta T_b$) and a duration forward in time after the anchor ($\Delta T_f$). In this example, $\Delta T_b$ is based on an expected during of a commercial and $\Delta T_f$ is based on the practice of including multiple commercials in a commercial break. Also, in this example $\Delta T_b$ is less than $\Delta T_f$, but in other examples $\Delta T_b$ and $\Delta T_f$ may have other relationships including, for example, $\Delta T_b$ is being greater than $\Delta T_f$. Also, in some examples, the durations of $\Delta T_b$ and/or $\Delta T_f$ is based on the detection of other watermarks including adjacent watermarks. In some examples, the duration of $\Delta T_b$, $\Delta T_f$, and/or the entire window is based on categories and/or other characteristics identified in one or more of the watermarks by the watermark evaluator 202. Further, in this example, the duration of the window generated by the window generator 204 is $\Delta T_b+\Delta T_f$. In this example, the window is asymmetric about the anchor point, but in other examples, the window may be symmetric.

The signature comparator 206 uses the window generated by the window generator 204 and access signatures related to or associated with the media presented during the window. The signature of the media presented during the window are known herein as query signatures. The signature comparator accesses the query signatures from the query signature buffer 208. The query signature buffer 208 may receive the query signatures with the meter data transmitted by or from the media device meters 106*a*, 106*b*, 106*c*. The query signatures may be generated at the media device meters 106*a*, 106*b*, 106*c* and/or at the AME 108.

The signature comparator 206 also accesses the reference signature database 210, which includes a library of signatures kept by or accessible to the AME of volumes of media that can be used by the signature comparator 206 as points of reference for comparison. The reference signatures are generated from reference media. In this example, the signature comparator accesses a subset of the reference signatures in the reference database 210. The subset is determined based on the category of media identified by the watermark evaluator 202 from the detected watermark. For example, if the detected watermark indicates that the media is a commercial, the subset of reference signatures accessed by the signature comparator 206 could include only signatures associated with that commercial or different versions of that commercial and/or signatures associated with media that are commercials in general. In another example, if the detected watermark indicates that the media was presented on a specific network such as, for example, NBC, then the subset of reference signatures accessed by the signature comparator 206 could include only signatures associated with media that is presented on NBC. Other categorization or classification based on other characteristics may also be used including, for example, geographic region of a broadcast or presentation, time of day of a broadcast or presentation, medium such as television or radio of a broadcast or presentation and/or other categories or similar characteristics that can reduce the full library of signatures kept by or accessible to the AME to a subset of reference signatures.

The signature comparator 206 compares one or more of the query signatures that have a time value within the search window with the subset of reference signatures associated with the category to identify the media. For example, the signature comparator 206 compares the query signatures with the reference signatures using a first criterion such as, for example, a 60% match. This is a lower threshold or a relaxed criterion than may be used when the query signature is compared against a larger reference library because the reduction of the reference library to the subset of reference signatures already eliminated irrelevant media.

The signature comparator 206 determines that the query signature matches one of the reference signatures because the threshold level of similarity (e.g., 60% or other suitable value) is met, the signature comparator 206 identifies the media presented during the window as the media associated with the reference signature. The creditor 212 can credit presentation of the media matching the reference signature at the time in the window. The credit can be used, for example, for ratings calculations and/or by owners or producers of commercials or other media to ensure or otherwise verify that the media has been presented as requested.

In some examples, the signature comparator 206 determines that none of the query signature(s) matches any of the reference signatures. In this example, the signature comparator 206 then broadens the search and analysis. For example, the signature comparator 206 compares a second subset of reference signatures and the query signatures. In some examples, the second subset is an enlarged subset. In some examples, the second subset can include the first subset and additional media. In some examples, the second subset is completely disparate to the first subset. In some examples, the second subset is related to a different category of categories identified by the watermark evaluator 202 from the detected watermark. In some examples, the second subset can extend to encompass the full library kept by or accessible to the AME.

In this example, the signature comparator 206 compares one or more of the query signatures that have a time value within the search window with the second subset of reference signatures to identify the media. For example, the signature comparator 206 compares the query signatures with the references signature using a second criterion such as, for example, a 90% match. This is a higher threshold or a heightened criterion than may be used when the query signature is compared against a smaller subset of reference signatures because there has been no prefiltering of media and closer scrutiny is used to identify the media.

When the signature comparator 206 determines that the query signature matches one of the reference signatures because the threshold level of similarity (e.g., 90% or other suitable value) is met, the signature comparator 206 identifies the media presented during the window as the media associated with the reference signature. The creditor 212 can credit presentation of the media matching the reference signature at the time in the window as indicated above.

The signature comparator 206 can continue to operate using larger and larger subsets of reference signatures until a match is determined. In addition, the signature comparator 206 can continue with additional watermarks serving as anchor points such as, for example, the watermarks shown in FIG. 3 in the second commercial break.

The AME 108 may also use the data analyzed and generated by the media identifier 110 to determine how much of presented media was viewed by, heard by, or otherwise exposed to a subject. For example, the watermark detection may provide indication that media was presented at the time of the watermark but may not provide the level granularity desired to know just how much of the media the subject was exposed to between watermarks. For example, a subject may have been watching a television program at a first time as indicated by a detected watermark. The subsequent watermark presented during that television program may not be detected. It would be unknown when exactly between the two watermarks the subject stopped viewing the television program. The media identifier 110 can supply the missing information based on the use of the signature comparator 206 and the window generator 204 where the signature comparator 206 compares query signatures to reference signature during the window anchored about the time of the detected watermark as disclosed herein.

While an example manner of implementing the media identifier 110 of FIG. 1 is illustrated in FIG. 2, one or more of the elements, processes and/or devices illustrated in FIG. 2 may be combined, divided, re-arranged, omitted, eliminated and/or implemented in any other way. Further, the example media meter devices 106*a*, 106*b*, 106*c*, the example watermark evaluator 202, the example window generator 204, the examiner signature comparator 206, the example query signature buffer 208, the examiner reference signature database 210, the example creditor 212, and/or, more generally, the example media identifier 110 of FIGS. 1 and 2 may be implemented by hardware, software, firmware, and/or any combination of hardware, software, and/or firmware. Thus, for example, any of the example media meter devices 106*a*, 106*b*, 106*c*, the example watermark evaluator 202, the example window generator 204, the examiner signature comparator 206, the example query signature buffer 208, the examiner reference signature database 210, the example creditor 212, and/or, more generally, the example media identifier 110 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC (s)), programmable logic device(s) (PLD(s)), and/or field programmable logic device(s) (FPLD(s)). When reading any of the apparatus or system claims of this patent to cover a purely software and/or firmware implementation, at least one of the example media meter devices 106*a*, 106*b*, 106*c*, the example watermark evaluator 202, the example window generator 204, the examiner signature comparator 206, the example query signature buffer 208, the examiner reference signature database 210, the example creditor 212, and/or the example media identifier 110 is/are hereby expressly defined to include a non-transitory computer readable storage device or storage disk such as a memory, a digital versatile disk (DVD), a compact disk (CD), a Blu-ray disk, etc. including the software and/or firmware. Further still, the example media identifier 110 of FIGS. 1 and 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
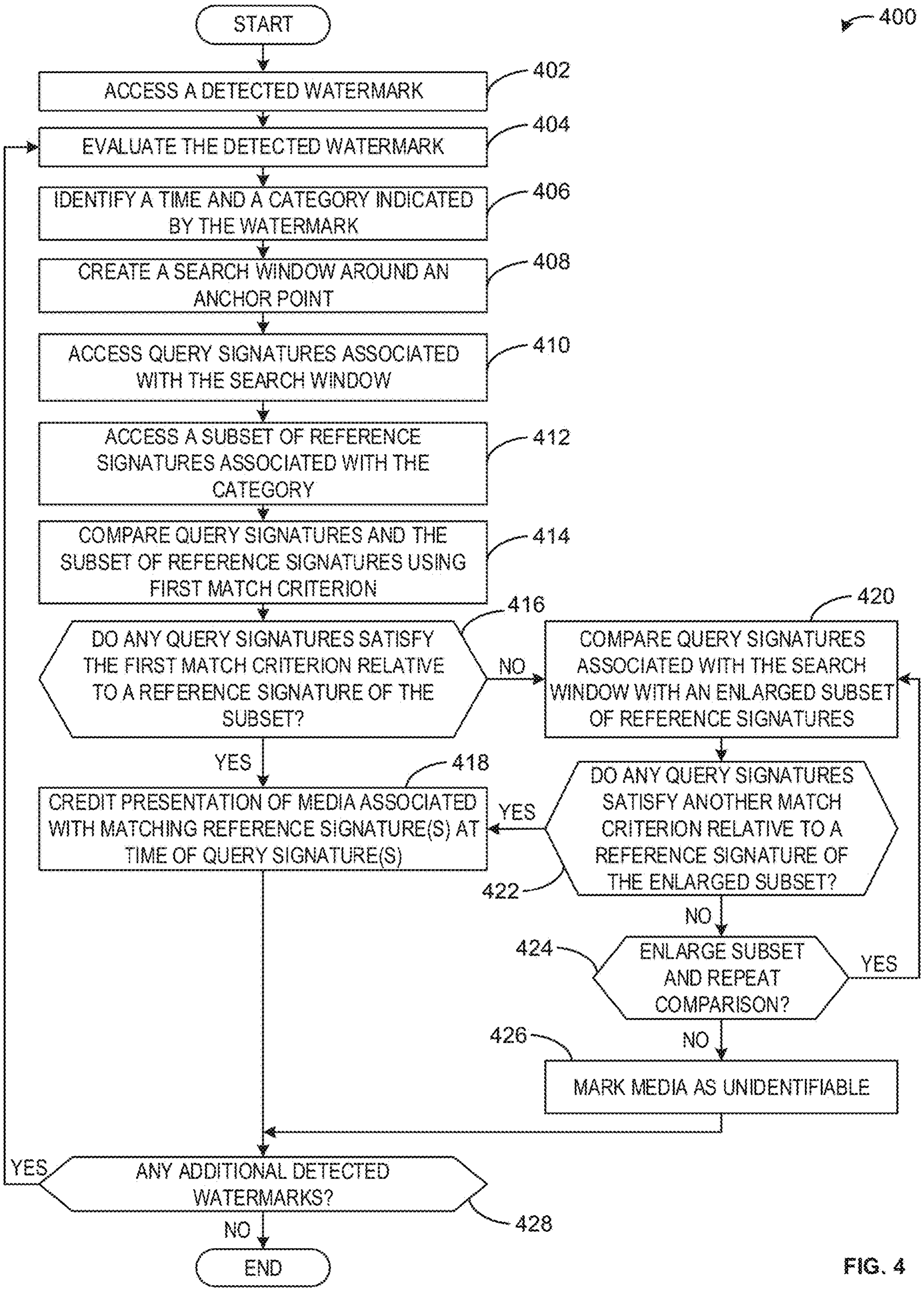
FIG. 4 is a flowchart representative of machine readable instructions which may be executed to implement the example media identifier of FIGS. 1 and 2.

A flowchart representative of example hardware logic, machine readable instructions, hardware implemented state machines, and/or any combination thereof for implementing the media identifier 110 of FIGS. 1 and 2 is shown in FIG. 4. The machine readable instructions may be an executable program or portion of an executable program for execution by a computer processor such as the processor 512 shown in the example processor platform 500 discussed below in connection with FIG. 5. The program may be embodied in software stored on a non-transitory computer readable storage medium such as a CD-ROM, a floppy disk, a hard drive, a DVD, a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowchart illustrated in FIG. 4, many other methods of implementing the example media identifier 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIG. 4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

“Including” and “comprising” (and all forms and tenses thereof) are used herein to be open ended terms. Thus, whenever a claim employs any form of “include” or “comprise” (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase “at least” is used as the transition term in, for example, a preamble of a claim, it is open-ended in the same manner as the term “comprising” and “including” are open ended. The term “and/or” when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

The program 400 of FIG. 4 may be executed to identify media using a hybrid of watermarks and signatures. In operation, the watermark evaluator 202 of the media identifier 110 accesses a detected watermark (block 402). The watermark evaluator 202 evaluates the detected watermark (block 404) and identifies a time and a category indicated by the watermark (block 406). For example, the watermark evaluator 202 determines a time at which the detected watermark was presented. In addition, the watermark evaluator 202 determines a category identified by the detected watermark which can include for example, a media type, a broadcast network, and/or other characteristic related to the media and/or the presentation of the media.

The window generator 204 uses the time identified by the watermark evaluator 202 as an anchor point and creates a search window around the anchor point (block 408). In some examples, the window includes a period of time before and a period of time after the anchor point.

The signature comparator 206 accesses query signatures associated with the search window (block 410). The query signatures relate to media presented during the search window and are accessed by the signature comparator 206 from the query signature buffer 208. The signature comparator 206 also accesses a subset of reference signatures associated with the category identified by the watermark evaluator 202 (block 412). The subset of signatures includes signatures that are indicative of, related to, or otherwise associated with media that has a characteristic in common with the detected watermark including, for example, being the same or a similar type of media such as, for example, commercials. The reference signatures are accessed by the signature comparator 206 from the reference signature database.

The signature comparator 206 compares the query signatures and the subset of reference signatures using a first match criterion (block 414).

In some examples, the first match criterion may be a threshold level of similarity between the reference signature and the query signature. In some examples, the threshold level of similarity may be met when there is a 60% match between the reference signature and the query signature. Thus, in this example, the first match criterion is a 60% threshold of similarity. In other examples, other values or parameters may be used as the first match criterion.

The signature comparator 206 determines if one of the query signatures satisfies the first match criterion relative to a reference signature of the subset (block 416). Continuing with the example described above, the signature comparator 206 may determine that the query signature satisfy the first match criterion relative to a reference signature in the subset when there is a 60% match between the two.

When one of the query signatures satisfies the first match criterion relative to a reference signature of the subset (block 416), the presented media is identified and the creditor 212 credits presentation of the media associated with matching reference signature(s) at the time of the query signature(s) (block 418).

In some examples, the signature comparator 206 determines that none of the query signatures satisfies the first match criterion relative to a reference signature of the subset (block 416). The example program 400 continues when the signature comparator 206 comparing the query signature associated with the search window with an enlarged subset of reference signatures (block 420). The enlarged subset, in some examples, is a second group of reference signatures that may be a subset of similar size, a larger subset, and/or simply different reference signatures. In this context “enlarged” is meant to signify that an additional number of reference signatures (any number) are to be analyzed-beyond the subset previously analyzed by the signature comparator 206.

The signature comparator 206 determines if any of the query signatures satisfies another (e.g., a second) match criterion relative to a reference signature of the enlarged subset (block 422). In some examples, the first match criterion is a more relaxed measure than the second match criterion. For example, the first match criterion may be a lower threshold than the second match criterion. If, for example, the first match criterion is 60%, the second match criterion may be 90%. Thus, in this example, the signature comparator 206 determines if any of the query signatures matches 90% of a reference signature in the enlarged set.

When one of the query signatures satisfies the another or second match criterion relative to a reference signature of the enlarged subset (block 422), the presented media is identified and the creditor 212 credits presentation of the media associated with matching reference signature(s) at the time of the query signature(s) (block 418).

In some examples, the signature comparator 206 determines that none of the query signatures satisfies the another or second match criterion relative to a reference signature of the enlarged subset (block 422). The example program 400 continues when the media identifier 110 and/or signature comparator 206 determining if the subset of reference signature to be analyzed by the signature comparator 206 is to be further enlarged for continued or repeated comparison (block 424).

If the signature comparator 206 is to compare the query signatures to another enlarged subset of reference signatures, the program continues with the signature comparator 206 comparing the query signature associated with the search window with an enlarged subset of reference signatures, i.e., another enlarged set or a third subset of reference signatures (block 420). The example program 400 then continues with the signature comparator 206 determining if any of the query signatures satisfies yet another (e.g., a third) match criterion relative to a reference signature of the enlarged subset (block 422).

The program 400 can continue through successive loops of blocks 420, 422, 424 until a match is made, media is identified, and control continues via block 418. Alternatively, in some examples, the media identifier 110 and/or signature comparator 206 determines that no more subsets of reference signature are to be analyzed by the signature comparator 206 (block 424). In some examples, the media identifier 110 marks the media as unidentified (block 426).

When the media has been identified and credited (block 418) and/or when the media has been marked as unidentified, the media identifier 110 and/or the watermark evaluator 202 determines if there are additional watermarks detected (block 428). If there are additional watermarks detected, the program 400 continues with the watermark evaluator evaluating the detected watermark (block 404). If the media identifier 110 and/or the watermark evaluator 202 determines that there are no additional watermarks detected (block 428), the example program 400 ends.

Figure 5:
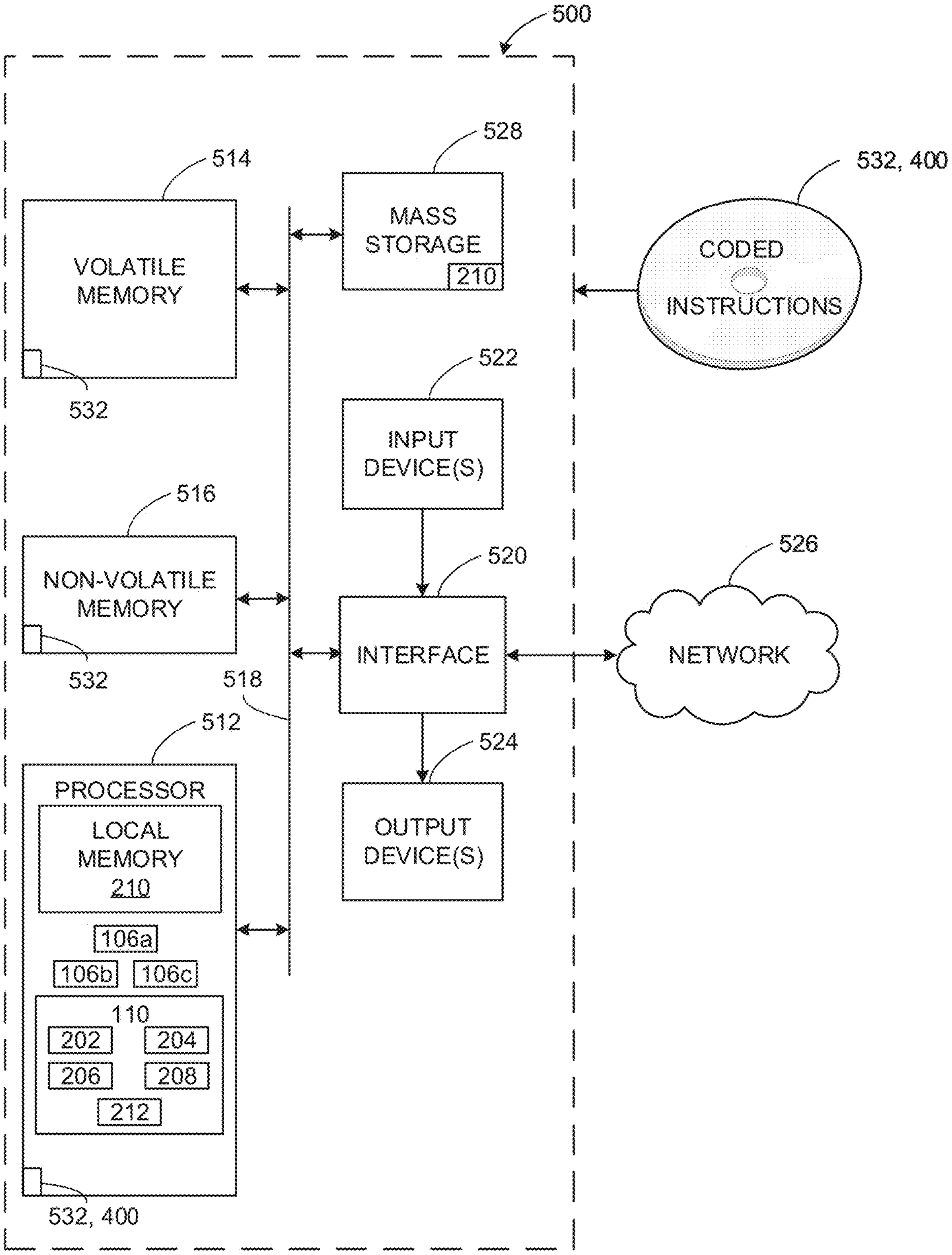
FIG. 5 is a block diagram of an example processing platform structured to execute the instructions of FIG. 4 to implement the example media identifier of FIGS. 1 and 2.

FIG. 5 is a block diagram of an example processor platform 500 structured to execute the instructions of FIG. 4 to implement the media identifier 110 of FIGS. 1 and 2. The processor platform 500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 500 of the illustrated example includes a processor 512. The processor 512 of the illustrated example is hardware. For example, the processor 512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 512 implements one or more of the media device meters 106*a*, 106*b*, 106*c*, the media identifier 110, the watermark evaluator 202, the window generator 204, the signature comparator 206, the query signature buffer 208, and the creditor 212.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), a Bluetooth® interface, a near field communication (NFC) interface, and/or a PCI express interface.

In the illustrated example, one or more input devices 522 are connected to the interface circuit 520. The input device (s) 522 permit(s) a user to enter data and/or commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 520 of the illustrated example, thus, typically includes a graphics driver card, a graphics driver chip, and/or a graphics driver processor.

The interface circuit 520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 500 of the illustrated example also includes one or more mass storage devices 210, 528 for storing software and/or data. Examples of such mass storage devices 210, 528 include floppy disk drives, hard drive disks, compact disk drives, Blu-ray disk drives, redundant array of independent disks (RAID) systems, and digital versatile disk (DVD) drives.

The machine executable instructions 400 of FIG. 4 and/or other machine executable instructions 532 may be stored in the mass storage device 528, in the volatile memory 514, in the non-volatile memory 516, and/or on a removable non-transitory computer readable storage medium such as a CD or DVD.

From the foregoing, it will be appreciated that example apparatus, system, articles of manufacture, and methods have been disclosed that use watermarks detected from presented media as anchor points to trigger a comparison of signatures generated from the presented media with a subset of reference signatures to identify the presented media and/or other media presented adjacent to and/or interleaved with the presented media. The watermark provides timing information and a category of the media or characteristic of the media. A window for comparison is generated about the anchor point, and signatures from the presented media that are within the window are analyzed against only a subset of reference signatures. The signatures in the subset of reference signatures relate to the identified category. Therefore, significantly fewer reference signatures are compared to the signatures from the presentation in order to identify the presented media and/or adjacent media. This reduction in the number of reference signatures needed for comparison to identify reducing search time and processing resources needed for signature matching. These examples further improve media monitoring accuracy under circumstances where watermark detection problems are present.

The disclosed apparatus, systems, articles of manufacture, and methods improve the efficiency of using a computing device by reducing the resources needed to identify media when watermarks are insufficient and reducing the time needed to perform signature matching. These examples further provide an efficient two-stage signature comparison and delay the onset of signature comparison until the library of reference signatures is reduced. In addition, these examples enable a computer to reliably detect short duration media presentations including short advertisement that the computer otherwise may not have detected. The disclosed apparatus, systems, articles of manufacture, and methods are accordingly directed to one or more improvement(s) in the functioning of a computer.

An example apparatus to identify media using watermarks and signatures is disclosed herein. The example apparatus includes a watermark evaluator to determine a time and a category indicated by a watermark detected in the media; a window generator to determine a search window based on the time indicated by the watermark; and a signature comparator to compare a query signature having a time value within the search window with a subset of reference signatures associated with the category to identify the media, the query signature generated from the media, the subset of reference signatures generated from reference media associated with the category.

In some examples, the signature comparator is to determine that the query signature matches a reference signature of the subset of reference signatures when the query signature and the reference signature match within a threshold.

In some examples, the example apparatus also includes a creditor to, in response to the query signature matching with the reference signature, identify the media as the reference media corresponding to the reference signature and to credit presentation of the media.

In some examples, the subset of reference signatures is a first subset of reference signatures, the signature comparator is to determine if the query signature matches a reference signature of the first subset of reference signatures when the query signature and the reference signature match within a first threshold. In addition, in such examples, when comparison of the query signature with the first subset of reference signatures does not yield a match, the signature comparator is to compare the query signature with a second subset of reference signatures to identify the media.

In some examples, the signature comparator is to determine that the query signature matches a reference signature of the second subset of reference signatures when the query signature and the reference signature match within a second threshold.

In some examples, the second threshold is different than the first threshold. In some examples, the second threshold is lower than the first threshold.

In some examples, the second subset of reference signature includes the first subset of reference signatures.

In some examples, the category is a first category and the second subset of reference signatures is associated with a second category different from the first category. In some examples, the category includes advertisements. In some examples, the category includes a media presentation channel.

In some examples, the query signature is a first query signature and the signature comparator is to analyze a plurality of query signatures having time values within the search window to determine a duration of presentation of the media.

In some examples, the search window extends a first duration of time before the time indicated by the watermark and extends a second duration of time after the time indicate by the watermark, the second duration different from the first duration.

Also disclosed herein is an example non-transitory computer readable storage medium comprising computer readable instructions that, when executed, cause a machine to at least: determine a time and a category indicated by a watermark detected in a media; determine a search window based on the time indicated by the watermark; and compare a query signature having a time value within the search window with a subset of reference signatures associated with the category to identify the media, the query signature generated from the media, the subset of reference signatures generated from reference media associated with the category.

In some examples, the instructions cause the machine to determine that the query signature matches a reference signature of the subset of reference signatures when the query signature and the reference signature match within a threshold.

In some examples, the subset of reference signatures is a first subset of reference signatures, the threshold is a first threshold, and when the query signature does not match a reference signature of the first subset of reference signatures, the instructions cause the machine to: compare the query signature with a second subset of reference signatures to identify the media; and determine that the query signature matches a reference signature of the second subset of reference signatures when the query signature and the reference signature of the second subset of reference signatures match within a second threshold.

Also disclosed herein is an example method to identify media. The example method includes determining, by executing instructions with a processor, a time and a category indicated by a watermark detected in the media; determining, by executing instructions with a processor, a search window based on the time indicated by the watermark; and comparing, by executing instructions with a processor, a query signature having a time value within the search window with a subset of reference signatures associated with the category to identify the media, the query signature generated from the media, the subset of reference signatures generated from reference media associated with the category.

Also disclosed herein is an example apparatus to identify media using watermarks and signatures, in which the apparatus includes a watermark evaluator to determine an identifier indicated by a watermark detected in the media. The example apparatus also includes a signature comparator to compare a query signature with a subset of reference signatures associated with the identifier to identify the media, the query signature generated from the media, the reference signatures generated from reference media associated with the identifier.

In some examples, the identifier is a category of media. Also, in some examples, the identifier is a time, and the example apparatus further includes a window generator to determine a search window based on the time indicated by the watermark, where the query signature has a time value within the search window.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:

determining a media identifier characterizing a media presented by a media device, wherein the media identifier is associated with a watermark detected in the media;

determining a first match score for a query signature and one or more first reference signatures included in a first subset of reference signatures, wherein the query signature comprises a time value within a search window determined based on a time indicated by the watermark, and wherein the first subset of reference signatures is generated from reference media associated with the media identifier; and based on determining whether the first match score satisfies a threshold, determining a second match score for the query signature and one or more second reference signatures included in a second subset of reference signatures to identify the media presented by the media device, wherein the second subset of reference signatures is different from the first subset of reference signatures.

2. The method of claim 1, wherein the threshold is a first threshold, and wherein the method further comprises:

determining whether the second match score satisfies a second threshold, wherein the second threshold is higher than the first threshold.

3. The method of claim 2, further comprising:

based on determining that the second match score for the query signature and a given reference signature included in the second subset of reference signatures satisfies the second threshold, crediting media presented by the media device as reference media associated with the given reference signature.

4. The method of claim 1, wherein the second subset of reference signatures comprises the first subset of reference signatures.

5. The method of claim 1, wherein the second subset of reference signatures is associated with a different media identifier than the media identifier associated with the watermark detected in the media.

6. The method of claim 1, wherein the first match score and the second match score are each a numerical value that is a percentage value.

7. The method of claim 1, wherein the second subset of reference signatures is larger than the first subset of reference signatures.

8. The method of claim 1, wherein the media identifier comprises at least one of: a category associated with the watermark or a time of detection of the watermark.

9. The method of claim 8, wherein the category comprises at least one of: an advertisement or a media presentation channel.

10. An audience measurement system comprising:

a processor and a memory having stored thereon machine readable instructions that, when executed by the processor, cause the audience measurement system to perform operations comprising:

determining a media identifier characterizing a media presented by a media device, wherein the media identifier is associated with a watermark detected in the media;

determining a first match score for a query signature and one or more first reference signatures included in a first subset of reference signatures, wherein the query signature comprises a time value within a search window determined based on a time indicated by the watermark, and wherein the first subset of reference signatures is generated from reference media associated with the media identifier; and based on determining whether the first match score satisfies a threshold, determining a second match score for the query signature and one or more second reference signatures included in a second subset of reference signatures to identify the media presented by the media device, wherein the second subset of reference signatures is different from the first subset of reference signatures.

11. The audience measurement system of claim 10, wherein the threshold is a first threshold, and wherein the operations further comprise:

determining whether the second match score satisfies a second threshold, wherein the second threshold is higher than the first threshold.

12. The audience measurement system of claim 11, wherein the operations further comprise:

based on determining that the second match score for the query signature and a given reference signature included in the second subset of reference signatures satisfies the second threshold, crediting media presented by the media device as reference media associated with the given reference signature.

13. The audience measurement system of claim 10, wherein the second subset of reference signatures comprises the first subset of reference signatures.

14. The audience measurement system of claim 10, wherein the second subset of reference signatures is associated with a different media identifier than the media identifier associated with the watermark detected in the media.

15. The audience measurement system of claim 10, wherein the first match score and the second match score are each a numerical value that is a percentage value.

16. The audience measurement system of claim 10, wherein the second subset of reference signatures is larger than the first subset of reference signatures.

17. The audience measurement system of claim 10, wherein the media identifier comprises at least one of: a category associated with the watermark or a time of detection of the watermark.

18. The audience measurement system of claim 17, wherein the category comprises at least one of: an advertisement or a media presentation channel.

19. A non-transitory machine readable storage medium comprising instructions that, when executed, cause a processor to perform operations comprising:

determining a media identifier characterizing a media presented by a media device, wherein the media identifier is associated with a watermark detected in the media;

determining a first match score for a query signature and one or more first reference signatures included in a first subset of reference signatures, wherein the query signature comprises a time value within a search window determined based on a time indicated by the watermark, and wherein the first subset of reference signatures is generated from reference media associated with the media identifier; and based on determining whether the first match score satisfies a threshold, determining a second match score for the query signature and one or more second reference signatures included in a second subset of reference signatures to identify the media presented by the media device, wherein the second subset of reference signatures is different from the first subset of reference signatures.

20. The non-transitory machine readable storage medium of claim 19, wherein the threshold is a first threshold, and wherein the operations further comprise:

determining whether the second match score satisfies a second threshold, wherein the second threshold is higher than the first threshold.

* * * * *